US010204461B2

(12) United States Patent
Chen et al.

(10) Patent No.: US 10,204,461 B2
(45) Date of Patent: Feb. 12, 2019

(54) DETECTION AND RECONSTRUCTION OF SENSOR FAULTS

(71) Applicant: GM GLOBAL TECHNOLOGY OPERATIONS LLC, Detroit, MI (US)

(72) Inventors: Shih-Ken Chen, Troy, MI (US); Nikolai K. Moshchuk, Grosse Pointe, MI (US); Bakhtiar B. Litkouhi, Washington, MI (US); Reza Zarringhalam, Oshawa (CA); Amir Khajepour, Waterloo (CA); William Melek, Mississauga (CA)

(73) Assignees: GM GLOBAL TECHNOLOGY OPERATIONS LLC, Detroit, MI (US); UNIVERSITY OF WATERLOO, Waterloo (CA)

( * ) Notice: Subject to any disclaimer, the term of this patent is extended or adjusted under 35 U.S.C. 154(b) by 35 days.

(21) Appl. No.: 15/214,162

(22) Filed: Jul. 19, 2016

(65) Prior Publication Data

US 2018/0025558 A1 Jan. 25, 2018

(51) Int. Cl.
*B60W 50/02* (2012.01)
*G07C 5/08* (2006.01)
*B60W 50/00* (2006.01)
*G05B 23/02* (2006.01)

(52) U.S. Cl.
CPC ......... *G07C 5/0808* (2013.01); *B60W 50/00* (2013.01); *G05B 23/0221* (2013.01); *G05B 2219/37537* (2013.01)

(58) Field of Classification Search
CPC ........... G05B 23/0221; G05B 23/0243; G05B 23/0297; G07C 5/08; B60W 2050/0215

USPC ..................... 701/29.7, 30.2, 30.7
See application file for complete search history.

(56) References Cited

U.S. PATENT DOCUMENTS 6,427,102 B1 * 7/2002 Ding ............... B60T 8/1755
701/29.2
2009/0198408 A1 * 8/2009 Salman ............ B60W 50/0205
701/29.2

FOREIGN PATENT DOCUMENTS

CN 105034988 A * 11/2015

OTHER PUBLICATIONS

Unger et al., Fault Tolerant Sensors for Vehicle Dynamics Control, Jun. 2006, Proceedings of the 2006 American Control Conference (Year: 2006).*

(Continued)

*Primary Examiner* — Nadeem Odeh
(74) *Attorney, Agent, or Firm* — Lorenz & Kopf, LLP

(57) ABSTRACT

Methods and systems are provided for detecting faults in a sensor and reconstructing an output signal without use of the faulty sensor. In one embodiment, a method includes: receiving, by a processor, sensor data indicating a measured value from a first sensor; receiving, by a processor, sensor data indicating measured values from a plurality of other sensors; computing, by a processor, virtual values based on a vehicle model and the sensor data from the plurality of other sensors; computing, by a processor, a residual difference between the measured value from the first sensor and the virtual values; detecting, by a processor, whether a fault exists in the first sensor based on the residual difference; and when a fault in the sensor is detected, generating, by a processor, a control value based on the virtual values instead of the measured value.

16 Claims, 3 Drawing Sheets

(56) References Cited

OTHER PUBLICATIONS

Machine Translation: Gao, CN-105034988-A, Nov. 2015, Chinese Patent Office Publication (Year: 2015).*
Wikipedia, Kalman Filter, Jun. 1, 2015, Wikipedia Online Encyplopedia (https://en.wikipedia.org/wiki/Kalman_filter) (Year: 2015).*
Ding et al., Model-based diagnosis of sensor faults for ESP systems, Jul. 2004, Control Engineering Practice—A Journal of IFAC, the International Federation of Automatic Control, vol. 12, Issue 7 (Year: 2004).*
Li et al., Model-Based Sensor Fault Detection and Isolation Method for a Vehicle Dynamics Control System, Article first published: Apr. 27, 2016 (Issue published: Feb. 1, 2017), Proceedings of the Institution of Mech. Eng., Part D: Journal of Automobile Engineering, vol. 231, Issue 2 (Year: 2016).*

* cited by examiner

DETECTION AND RECONSTRUCTION OF SENSOR FAULTS

TECHNICAL FIELD

The technical field generally relates to detection of sensor faults in a vehicle control system and relates to the reconstruction of sensor values measured by faulty sensors.

BACKGROUND

Modern cars usually incorporate control systems to assist the driver in controlling the vehicle. Control systems may assist the driver by, for example, stabilizing the vehicle in extreme driving situations, such as when the tires lose traction on a road surface. Operation of the control system usually depends on inputs from various kinds of sensors, such as yaw rate sensors, lateral acceleration sensors, longitudinal acceleration sensors, and/or wheel speed sensors. Faulty sensors can cause unpredictable results in the control system.

Some sensor monitoring systems require two sensors. For example, a primary sensor output is compared with a secondary sensor output, and if the primary sensor output deviates from the secondary sensor output by a fixed amount, then a fault of the sensor is registered. Monitoring systems that require redundant sensors are expensive.

Accordingly, it is desirable to provide methods and systems in which redundant sensors are not necessarily required. Furthermore, it is desirable to provide methods and systems to control the system even with a faulty sensor. Further desirable features and characteristics of the present invention will become apparent from the subsequent detailed description and the appended claims, taken in conjunction with the accompanying drawings and the foregoing technical field and background.

SUMMARY

Methods and systems are provided for detecting faults in a sensor and reconstructing an output signal without use of the faulty sensor. In one embodiment, a method includes: receiving, by a processor, sensor data indicating a measured value from a first sensor; receiving, by a processor, sensor data indicating measured values from a plurality of other sensors; computing, by a processor, virtual values based on a vehicle model and the sensor data from the plurality of other sensors; computing, by a processor, a residual difference between the measured value from the first sensor and the virtual values; detecting, by a processor, whether a fault exists in the first sensor based on the residual difference; and when a fault in the sensor is detected, generating, by a processor, a control value based on the virtual values instead of the measured value.

In one embodiment, a system includes a non-transitory computer readable medium. The non-transitory computer readable medium includes a first module that receives, by a processor, sensor data indicating a measured value from a first sensor, that receives, by a processor, sensor data indicating measured values from a plurality of other sensors, and that computes, by a processor, virtual values based on a vehicle model and the sensor data from the plurality of other sensors. The non-transitory computer readable medium further includes a second module that computes, by a processor, a residual difference between the measured value from the first sensor and the virtual values. The non-transitory computer readable medium further includes a third module that detects, by a processor, whether a fault exists in the first sensor based on the residual difference, and when a fault in the sensor is detected, generating, by a processor, a control value based on the virtual values instead of the measured value.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
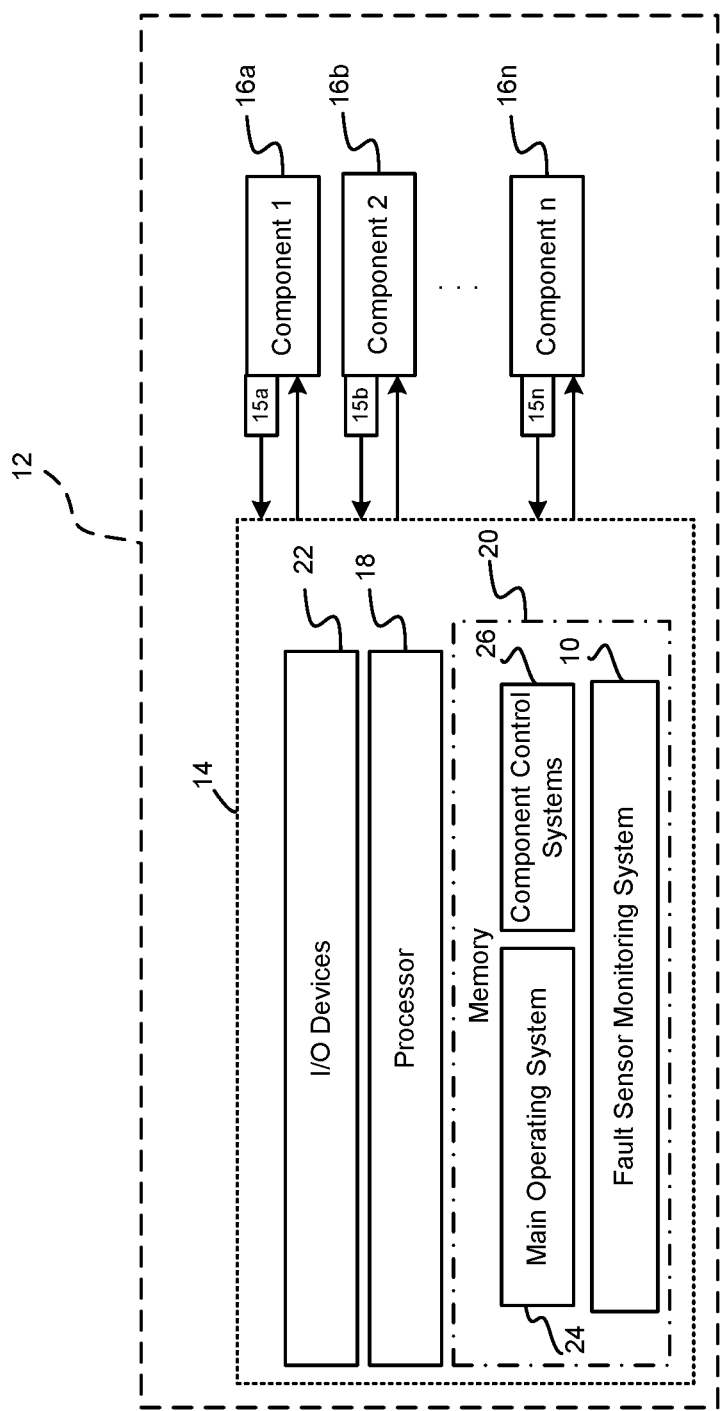
FIG. 1 is functional block diagram of a vehicle having a sensor fault monitoring system in accordance with various embodiments.

It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of control systems, and that the vehicle system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

With reference now to FIG. 1, a vehicle 12 is shown to include a sensor fault monitoring system 10 in accordance with various embodiments. Although the figures shown herein depict an example with certain arrangements of elements, additional intervening elements, devices, features, or components may be present in actual embodiments. It should also be understood that FIG. 1 is merely illustrative and may not be drawn to scale.

As shown, the vehicle 12 includes at least one control module 14. The control module 14 controls one or more components 16a-16n of the vehicle 12. The components 16a-16n may be associated with autonomous or semi-autonomous systems of the vehicle 12. For example, the control module 14 controls vehicle components 16a-16n of a braking system (not shown), a steering system (not shown), and/or a chassis system (not shown) of the vehicle 12 each of which may be autonomously controlled (e.g., without driver input) and/or semi-autonomously controlled (e.g., with some driver input).

In various embodiments, the control module 14 includes at least one processor 18, memory 20, and one or more input and/or output (I/O) devices 22. The I/O devices 22 communicate with one or more sensors and/or actuators associated with the components 16a-16n of the vehicle 12. The memory 20 stores instructions that can be performed by the processor 18. The instructions stored in memory 20 may include one or more separate programs, each of which comprises an ordered listing of executable instructions for implementing logical functions.

In the example of FIG. 1, the instructions stored in the memory 20 are part of a main operating system (MOS) 24 and one or more component control systems 26. The main operating system 24 includes logic for controlling the performance of the control module 14 and provides scheduling, input-output control, file and data management, memory management, and communication control and related services. The component control systems 26 include logic for controlling the performance of one or more associated components 16a-16n. In various embodiments, the instructions are further part of the sensor fault monitoring system 10 described herein.

When the control module 14 is in operation, the processor 18 is configured to execute the instructions stored within the memory 20, to communicate data to and from the memory 20, and to generally control operations of the vehicle 12 pursuant to the instructions. The processor 18 can be any custom made or commercially available processor, a central processing unit (CPU), an auxiliary processor among several processors associated with the control module 14, a semiconductor based microprocessor (in the form of a microchip or chip set), a macroprocessor, or generally any device for executing instructions.

In various embodiments, the processor 18 executes the instructions of the sensor fault monitoring system 10. The sensor fault monitoring system 10 generally determines one or more faults of one or more sensors 15a-15n associated with the components 16a-16n of the vehicle 12. In various embodiments, the sensors 15a-15n can include a yaw rate sensor, a lateral acceleration sensor, and/or a longitudinal acceleration sensor.

In various embodiments, the sensor fault monitoring system 10 determines one or more faults of one of the sensors based on virtual values and a measured value. The virtual value may be computed based on one or more vehicle models. The vehicle models take into account sensor values measured from the sensors other than the sensor being monitored, as will be discussed in more detail below. In various embodiments, when a fault of the sensor is detected, the sensor fault monitoring system 10 reconstructs a sensor value based on the computed virtual values as will be discussed in more detail below. In various embodiments, the computed virtual values generated can be used as an input to the component control systems 26 to control the components 16a-16n. For example, the computed virtual values can be used more specifically in a vehicle stability system or electronic stability program such as an active front wheel or rear wheel steering system that assists the vehicle operator in steering the vehicle 12 in response to a detected rotation of a steering wheel, an active suspension system that changes vehicle suspension in response to road conditions and vehicle operating conditions, an automatic braking system that assists the vehicle operator in response to an undesired turning or yaw of the vehicle 12, an anti-lock braking system that assists the vehicle operator in response to a roadway of low or varying coefficient of friction, an traction control system that assists the vehicle operator in instances where there is a high risk of spinning of the driven wheels, a cornering assist system that assist the vehicle operator where the operator might over- or under-steer, etc. In another example, the computed virtual values can be used in automated, semi-automated or autonomous driving systems that need to be fail-safe or fail-operational. Such systems can use the virtual values when a senor is faulty.

Figure 2:
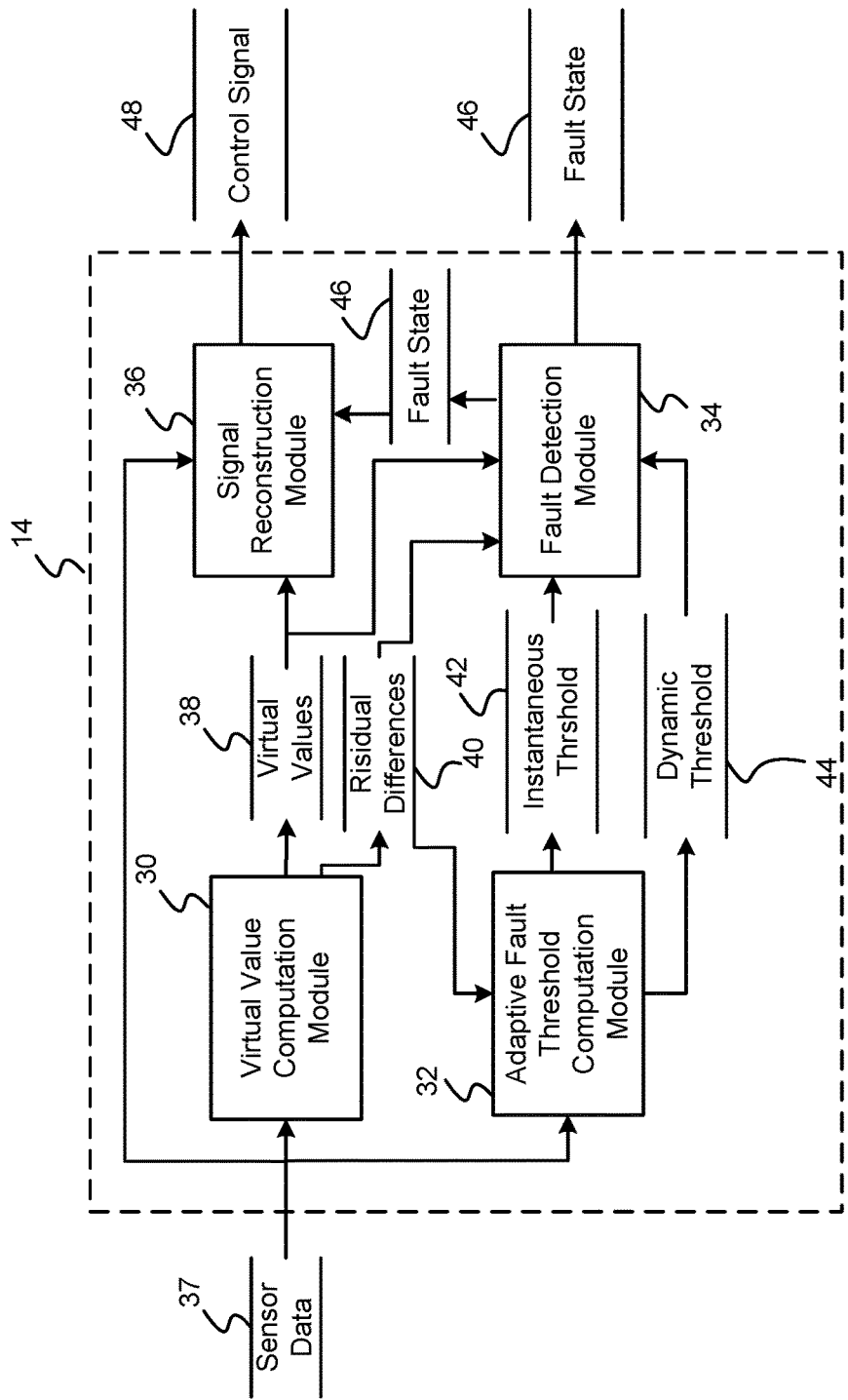
FIG. 2 is a dataflow diagram of a sensor fault monitoring system in accordance with various embodiments.

Referring now to FIG. 2 and with continued reference to FIG. 1, a dataflow diagram illustrates the sensor fault monitoring system 10 in more detail in accordance with various exemplary embodiments. As can be appreciated, various exemplary embodiments of the sensor fault monitoring system 10, according to the present disclosure, may include any number of modules and/or sub-modules. In various exemplary embodiments, the modules and sub-modules shown in FIG. 2 may be combined and/or further partitioned to similarly determine a fault of a sensor and to reconstruct a sensor signal value based on the fault. In various embodiments, the sensor fault monitoring system 10 receives inputs from the one or more sensors 15a-15n associated with the components 16a-16n of the vehicle 12, from other control modules (not shown) within the vehicle 12, and/or from other modules (not shown) within the control module 14. In various embodiments, the sensor fault monitoring system 10 includes a virtual value computation module 30, an adaptive fault threshold computation module 32, a fault detection module 34, and a signal reconstruction module 36.

The virtual value computation module 30 receives as input sensor data 37 indicated measured values from the sensors 15a-15n. The virtual value computation module 30 computes virtual sensor values 38 and residual differences 40 based on the sensor data 37. In general, the virtual value computation module 30 computes the virtual sensor values 38 based on a vehicle model and some of the sensor data 37 (e.g., the sensed measurements other than the measurement associated with the sensor being monitored). In general, the virtual value computation module 30 computes the residual differences 40 based on the sensor data 37 and the computed virtual sensor values 38. Exemplary computation methods that may be performed by the virtual value computation module 30 are described in more detail below.

The adaptive fault threshold computation module 32 receives as input the sensor data 37. The adaptive fault threshold computation module 32 computes adaptive fault thresholds 42, 44. For example, the adaptive fault threshold computation module 32 computes an instantaneous adaptive threshold 42 and a dynamic adaptive threshold 44. Exemplary computation methods that may be performed by the adaptive fault threshold computation module are described in more detail below.

The fault detection module 34 receives as input the virtual sensor values 38, the residual differences 40, and the adaptive thresholds 42, 44. The fault detection module 34 evaluates the inputs to determine if a fault in a sensor has occurred. For example, the fault detection module 34 compares the residual differences 40 with the adaptive thresholds 42, 44 to determine if a fault has occurred. The fault detection module 34 sets a fault state 46 that is associated with the sensor being monitored based on the determination. For example, the fault state may be set to one indicating that a fault has been detected or zero indicating that a fault has not been detected.

The signal reconstruction module 36 receives as input the virtual sensor values 38 and the fault state 46. The signal reconstruction module 36 generates a control value 48 for the sensor that is being monitored. The control value 48 is to be used by the component control systems 26 for controlling the component 16a-16n. For example, when the fault state 46 indicates that a fault has been detected, the signal reconstruction module 36 sets the control value 48 based on the virtual sensor values 38. In another example, when the fault state 46 indicates that no fault has been detected, the signal reconstruction module 36 sets the control value 48 based on the sensed value. Exemplary computation methods that may be performed by the signal reconstruction module are described in more detail below.

Figure 3:
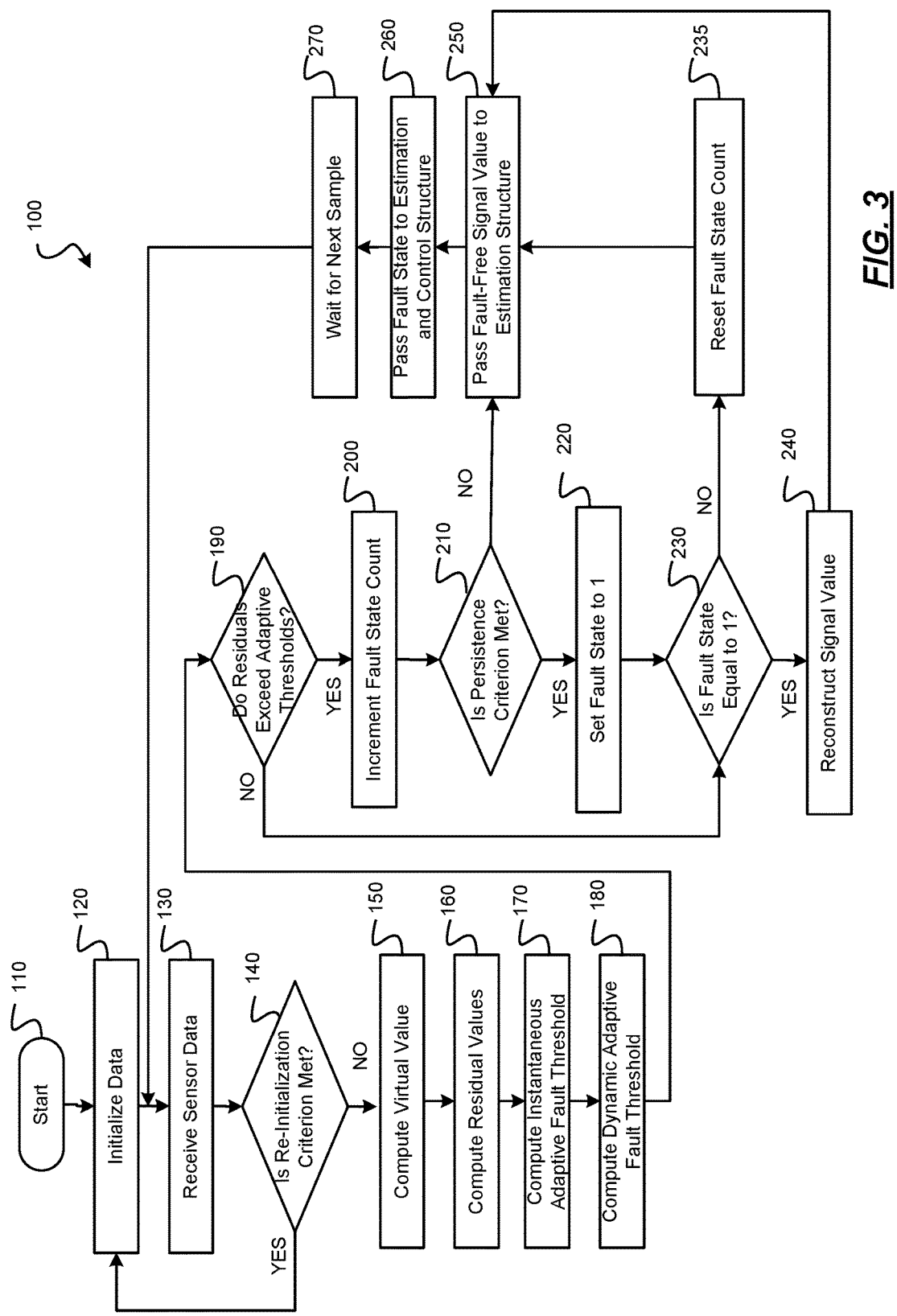
FIG. 3 is a flowchart illustrating a sensor fault monitoring method in accordance with various embodiments.

With reference now to FIG. 3, and with continued reference to FIGS. 1 and 2, a flowchart illustrates a method 100 for determining a fault of a sensor and reconstructing a sensor signal based thereon. The method 100 can be implemented in connection with the vehicle 12 of FIG. 1 and can be performed by the sensor fault monitoring system 10 of FIG. 2, in accordance with various exemplary embodiments. As can be appreciated in light of the disclosure, the order of operation within the method 100 is not limited to the sequential execution as illustrated in FIG. 3, but may be performed in one or more varying orders as applicable and in accordance with the present disclosure. As can further be appreciated, the method 100 of FIG. 3 may be enabled to run continuously, may be scheduled to run at predetermined time intervals during operation of the vehicle 12 and/or may be scheduled to run based on predetermined events.

In various embodiments, the method may begin at 110. Thereafter, process parameters are initialized at 120. For example, certain parameters associated with the sensors 15a-15n are determined. These parameters include the initial fault state (S) of the sensors 15a-15n, an initial static fault bound gain ($B_s$), an initial dynamic fault bound gain ($B_d$), an initial dynamic threshold window size ($W_F$), an initial fault state count ($n_F$), an initial fault state window size ($N_F$), and vehicle parameters (P). As can be appreciated, these parameters may be pre-determined or may be computed upon initialization of the method 100.

At 130, sensor values are measured by the various sensors 15a-15n of the vehicle 12 and received by the system 10. These measured values may include, for example, the steering angle of a steering wheel, the angular velocity of the vehicle 12, the lateral acceleration of the vehicle 12, the yaw rate of the vehicle 12, and the longitudinal velocity of the vehicle 12. As can be appreciated, other values may, of course, be measured.

At 140, re-initialization criteria are evaluated. For example, it is determined whether the vehicle 12 is stationary (e.g., based on vehicle speed). If it is determined that the vehicle 12 is stationary, then the re-initialization criteria has been met and the process continues at 120 where the parameters are re-initialized. If it is determined that vehicle 12 is moving, the process parameters and sensor values determined at 120 and 130 respectively are used to detect whether there is a sensor fault, as detailed below.

For example, at 150, virtual sensor values are computed. Each virtual sensor value is preferably computed using a pre-determined vehicle model that is specific to the vehicle 12, and one or more measured sensor values from the sensors 15a-15n other than the sensor being monitored. As discussed above, the models will differ at least in the primary function used to calculate the virtual values and also in using at least one different sensor value from step 130 as an input.

At 160, the residual difference is then computed based on the measured value and the virtual value. For example, a residual difference between the computed virtual value and the measured sensor value is computed for a particular sensor. At 170, an instantaneous adaptive fault threshold is computed. The instantaneous adaptive fault threshold may be estimated based on the current driving condition of the vehicle 12 and other available information, such as the current dynamic region. The driving condition of the vehicle 12 and the dynamic region are determined using a vehicle model specific to the vehicle 12 and measured sensor values from the sensors 15a-15n. The vehicle model may be a model that takes into account how the vehicle 12 performs under certain conditions, for example slippery driving surfaces.

At 180, a dynamic adaptive fault threshold that changes over time is computed. For example, the dynamic adaptive threshold is built up from either the current instantaneous adaptive fault threshold or an average of a series of instantaneous adaptive fault thresholds built up over a time period, whichever is the larger. The instantaneous adaptive fault thresholds may be computed, and then combined to form a dynamic adaptive fault threshold.

At 190, the residual differences between the measured sensor values and the virtual sensor values are compared with the dynamic adaptive fault threshold. If the residual differences between the measured sensor values and the virtual sensor values are not greater than the dynamic adaptive fault threshold at 190, the method proceeds to 230 where the fault state is evaluated. If, however, the residual differences exceed the dynamic adaptive fault threshold, a fault state count associated with a particular sensor to register a potential fault with that sensor is incremented at 200.

In order to reduce false positive detection of faults in a sensor, persistence criterion is evaluated at 210. Specifically, during harsh maneuvering, the residual difference between the virtual sensor value and the measured sensor value may become temporarily large. In this instance, a purely instantaneous adaptive fault threshold may register a fault with the sensor, even though the sensor is in fact in a good working condition. In order to prevent this, it is determined whether the residual difference exceeds the dynamic adaptive fault threshold for a time window. The time window may be a predetermined time window or an adaptive time window. Use of a time window allows for the virtual sensor value to adjust to the harsh maneuver, and therefore increase the reliability of the fault detector by more accurately evaluating the residual difference.

If it is determined that the persistence criterion is met (e.g., if the residual difference exceeds the adaptive fault threshold for a time period longer than the adaptive time period) at 210, then a fault state associated with that sensor is set to one to indicate that the sensor has a fault at 220. The fault detector may then transmit a fault detection signal to the component control system 26. In various embodiments, the fault detection signal may contain information about the detected fault. For example, the fault detection signal may contain the time of the detection of the fault of the sensor.

If the persistence criterion is not met at 210, the fault state is not set to one, and no fault is registered. The fault free measured value is then provided to the component control system 26 for controlling the vehicle 12 at 250; and the fault state is provided to the component control system 26 at 260. The method continues at 270 by waiting for a next sample of data to be received.

If, at 230, the fault state of a sensor is not set to one, the fault state count is reset to zero at 235 and the fault free measured value is then provided to the component control systems 26 for controlling the vehicle 12 at 250; and the fault state is provided to the component control systems 26 at 260. The method continues at 270 by waiting for a next sample of data to be received.

If, however, at 230 the fault state of the sensor is set to one, a reconstruction of the failed sensor value is performed at 240. For example, a virtual sensor value is substituted for the measured sensor value. In various embodiments, the virtual sensor value may be based on an average of the computed virtual sensor values. In various embodiments, a weighted average can be applied to the virtual sensor valued used in reconstruction of the failed sensor value. The weights may be based on a weighted average function of the virtual sensor values, and the weighted average function is adaptively tuned based on the sensed driving condition of the vehicle 12. Basing the weighting on the sensed driving condition of the vehicle 12 allows for a more accurate reconstruction of the sensor value as conditions such as high slip and wheel lock may be taken into account.

The fault free value is then provided to the component control systems 26 for controlling the vehicle 12 at 250; and the fault state is provided to the component control systems 26 at 260. The method continues at 270 by waiting for a next sample of data to be received. In this way, the output signal to the component control system 26 is based on accurate values even when a sensor is faulty.

The equations used in the process for three exemplary sensors will be shown below. As used herein, the hat operator (^) represents an estimated or reconstructed variable. The dot operator () represents a derivative. The hat dot operator () represents the derivative of an estimated variable. The tilde operator () represents an error (e.g., difference between a measured and estimated variable. The "round" function returns the value of a number to the nearest integer. The k symbol represents a sample of time. In one example, virtual sensor values $a_{x_1}$ and $a_{x_2}$ for longitudinal acceleration, can be estimated as:

$$\hat{a}_{x_1} = \frac{1}{m}\left((\hat{F}_{xfl} + \hat{F}_{xfr})\cos(\delta) + (\hat{F}_{xrl} + \hat{F}_{xrr}) - \frac{ma_y L_r + I_z \dot{r} - (\hat{F}_{xfl} + \hat{F}_{xfr})(L_f + L_r)\sin(\delta)}{(L_f + L_r)\cos(\delta)}\sin(\delta)\right)$$

$$\hat{a}_{x_2} = \dot{\hat{v}}_x + g\sin(\hat{\theta}_v + \hat{\Theta}_r)$$

where:

$$I_{wij}\dot{\hat{\omega}}_{ij} = T_{ij} - R_e \hat{F}_{xij} + \Lambda \tilde{\omega}_{ij}$$

$$\hat{F}_{xij} = \frac{T_{ij} - I_{wij}\dot{\omega}_{ij}}{R_e} - \left(K_P \tilde{\omega}_{ij} + K_I \int \tilde{\omega}_{ij} dt + K_D \dot{\tilde{\omega}}_{ij}\right)$$

$$\tilde{\omega}_{ij} = \omega_{ij} - \hat{\omega}_{ij}$$

where $K_P$, $K_I$, $K_D$ and $\Lambda$ are constant observer gains, $\hat{F}_{xij}$ is the estimated longitudinal force, m is vehicle mass, T is the applied torque to the wheel, ij subscript indicates front-left (fl), front-right (fr), rear-left (rl) and rear-right (rr) corners, $a_x$ is the longitudinal acceleration, $a_y$ is the lateral acceleration, g is gravitational constant, $L_f$ and $L_r$ are the longitudinal distances between the center of gravity (CG) and the front and rear axles, respectively, $\theta$ is the pitch angle, $\Theta$ is the road grade angle, $\omega_{ij}$ is wheel angular velocity, $R_e$ is effective tire radius, $I_{wij}$ is the wheel moment of inertia about its spin axis, $I_z$ is the yaw moment of inertia, r is the yaw rate, $\delta$ is the steering angle, and $v_x$ is the longitudinal velocity.

One of the virtual sensor values is based on angular velocity of the wheels and steering angle amongst other sensor values and the other virtual sensor value is based on longitudinal velocity, thereby ensuring different models for determining virtual longitudinal acceleration relying on different sensor values.

The residual differences associated with the longitudinal acceleration can be computed using:

$$R_{1_{a_x}} = |a_x - \hat{a}_{x_1}|$$

$$R_{2_{a_x}} = |a_x - \hat{a}_{x_2}|$$

The instantaneous adaptive fault threshold associated with the longitudinal acceleration can be computed using:

$$T_{i_{a_x}} = B_{s_{a_x}} + B_{d_{a_x}}\left|\frac{1}{2}\left(\left(\frac{T_{rl} + T_{rr} + (T_{fl} + T_{fr})\cos(\delta)}{mR_e}\right) + \frac{R_e}{4}(\dot{\omega}_{rl} + \dot{\omega}_{rr} + (\dot{\omega}_{fl} + \dot{\omega}_{fr})\cos(\delta))\right)\right|$$

As can be seen, the instantaneous adaptive fault threshold may be based on the steering angle $\delta$, the dynamic bound gain $B_{d_{a_x}}$ and the static bound gain $$B_{s_{a_x}},$$

the angular acceleration of the front left $\dot{\omega}_{fl}$, front right $\dot{\omega}_{fr}$, rear left $\dot{\omega}_{rl}$, and rear right $\dot{\omega}_{rr}$ wheels, and other parameters. In particular, the harsher the vehicle condition, e.g. harsh driving maneuver, the greater the adaptive fault threshold.

The dynamic adaptive fault threshold associated with the longitudinal acceleration can be computed using:

$$T_{d_{a_x}} = \max\left(T_{i_x}(k), \frac{1}{W_{F_{a_x}}}(T_{i_{a_y}}(k-1) \ldots, T_{i_{a_y}}(k - W_{F_{a_x}}))\right)$$

As can be seen from the above equation, the dynamic adaptive fault threshold $T_{d_{a_x}}$ is chosen to be the larger of the current instantaneous adaptive fault threshold $T_{i_x}(k)$ and the averaged instantaneous adaptive fault threshold $$\frac{1}{W_{F_{a_x}}}(T_{i_{a_y}}(k-1) \ldots, T_{i_{a_y}}(k - W_{F_{a_x}})),$$

the average occurring over a dynamic threshold window size $W_{F_{a_x}}$. The window size is representative of a window time and is set by a predetermined number of previous instantaneous adaptive fault threshold terms.

The adaptive time window associated with the longitudinal acceleration may be computed using:

$$N_{F_{a_x}} = K_{1_{a_x}} + K_{2_{a_x}} \{\text{round}[\max(T_{d_{a_x}}(k), \ldots, T_{d_{a_x}}(k - W_{F_{a_x}})) - \min(T_{d_{a_x}}(k), \ldots, T_{d_{a_x}}(k - W_{F_{a_x}}))]\}$$

where $$K_{1_{a_y}} \text{ and } K_{2_{a_y}}$$

are predefined constants.

As can be seen from the above equation, the adaptive time window may be based upon current dynamic adaptive threshold values and previous dynamic adaptive threshold values. The adaptive time window is determined based on a variation in a predetermined number of current and previous dynamic adaptive threshold terms. In particular, a difference between a maximum and minimum dynamic adaptive thresholds from a number of current and previous dynamic adaptive thresholds. The adaptive time window is determined as an integer.

The persistence criterion associated with the longitudinal acceleration for fault detection may be defined as:

$$\text{For } i = k \text{ to } k - N_{F_{a_x}}$$
$$\begin{cases} R_{1_{a_x}}(i) > T_{d_{a_x}}(i) \\ R_{2_{a_x}}(i) > T_{d_{a_x}}(i) \end{cases}$$

As can be seen from the above equation, the value of each residual may be measured for the duration of the adaptive time window to reduce the occurrence of false positive sensor fault detection. In particular, it is determined whether the residual differences have exceeded the time corresponding dynamic adaptive threshold for a number of iterations including the current and previous dynamic adaptive thresholds. Only if the dynamic adaptive thresholds are exceeded for each iteration is a fault detected.

The reconstruction of the longitudinal acceleration can be computed using the virtual sensor values:

$$\hat{a}_x = \frac{1}{w_1 + w_2}(w_1 \hat{a}_{x_1} + w_2 \hat{a}_{x_2})$$
$$w_1 = 1 - w_2$$
$$w_2 = \frac{e^{-\gamma^2/(2\sigma^2)}}{4\pi\sigma} e^{-\frac{(\max(|\lambda_{fl}|,|\lambda_{fr}|,|\lambda_{rl}|,|\lambda_{rr}|)-\gamma)^2}{2\sigma^2}}$$

where $w_1$ and $w_2$ are weight factors, $\lambda_{ij}$ is wheel slip ratio, and $\sigma$, $\gamma$: are constant parameters.

As can be seen, the virtual sensor values can be weighted toward different vehicle models. For example, in a situation with a low wheel slip ratio, the weighting may be biased towards a first virtual value, which virtual value has been computed using a low wheel slip vehicle model, and vice versa. Biasing the weightings in this manner allows for more accurate prediction of the virtual values based on the dynamic condition of the car.

In another example, virtual sensor values $a_{y_1}$ and $a_{y_2}$ for lateral acceleration can be computed using:

$$\hat{a}_{y_1} = \hat{v}_x r + g\sin(\hat{\phi}_v + \Phi_r)$$
$$\hat{a}_{y_2} = \left[\frac{1}{2}\left(\frac{\omega_{rr} + \omega_{rl}}{2}R_e\right) + \left(\frac{\omega_{fr} + \omega_{fl}}{2}R_e\right)\cos(\delta)\right]\left(\frac{\omega_{fr} + \omega_{fl}}{e}R_e\right)\cos(\delta) + g\sin(\hat{\phi}_v + \Phi_r)$$

where e is the track width, $\phi_v$ is the body roll angle and $\Phi_r$ is the road bank angle One of the virtual sensor values is computed based on sensed yaw rate and sensed longitudinal velocity among other components, and the other virtual sensor value is computed based on steering angle and wheel angular velocities, thereby ensuring different models and different sensed input parameters for each model.

The residual differences associated with the lateral acceleration can be computed using:

$$R_{1_{a_y}} = |a_y - \hat{a}_{y_1}|$$
$$R_{2_{a_y}} = |a_y - \hat{a}_{y_2}|$$

The residual differences are respectively determined based on the current sensed lateral acceleration and the virtual sensor values.

The instantaneous adaptive fault threshold associated with the lateral acceleration can be computed using:

$$T_{i_{a_y}} = B_{s_{a_y}} + B_{d_{a_y}} \frac{1}{2}\left|\left(\left(\frac{\omega_{rr} - \omega_{rl}}{e}R_e\right) + \left(\frac{\omega_{fr} - \omega_{fl}}{e}R_e\right)\cos(\delta)\right)\left(\frac{\omega_{fr} + \omega_{fl}}{2}R_e\right)\cos(\delta)\right|$$

As before, the instantaneous adaptive fault threshold becomes larger with increasing vehicle angular acceleration, particularly based on sensed wheel angular velocities.

The dynamic adaptive fault threshold associated with the lateral acceleration can be computed using:

$$T_{d_{a_y}} = \max\left(T_{i_{a_y}}(k), \frac{1}{W_{F_{a_y}}}(T_{i_{a_y}}(k-1) \ldots, T_{i_{a_y}}(k - W_{F_{a_y}}))\right)$$

The dynamic adaptive fault threshold, as before, is based on the larger of the current instantaneous adaptive fault threshold and an average of a series of previous adaptive fault thresholds.

The adaptive time window associated with the lateral acceleration can be computed using:

$$N_{F_{a_y}} = K_{1_{a_y}} + K_{2_{a_y}} \{\text{round}[\max(T_{d_{a_y}}(k), \ldots, T_{d_{a_y}}(k - W_{F_{a_y}})) - \min(T_{d_{a_y}}(k), \ldots, T_{d_{a_y}}(k - W_{F_{a_{xy}}}))]\}$$

The adaptive time window, as before, is such that the more stable, or lower overall variation, the current dynamic adaptive threshold and a series (set in number) of previous dynamic adaptive thresholds, then the longer the window.

The persistence criterion associated with the lateral acceleration can be defined as:

$$\text{For } i = k \text{ to } k - N_{F_{a_x}}$$
$$\begin{cases} R_{1_{a_y}}(i) > T_{d_{a_y}}(i) \\ R_{2_{a_y}}(i) > T_{d_{a_y}}(i) \end{cases}$$

The persistence criterion evaluates whether the residual differences exceed the dynamic adaptive fault thresholds over a period of time corresponding to the adaptive time window. That is, the adaptive time window sets the number of previous residual differences are to be evaluated. The evaluation involves comparing the time corresponding pair of residuals and dynamic adaptive fault threshold at that time for each of the previous pairs thereof and the current pair thereof, where the number of previous pairs is set depending on the adaptive time window.

The reconstruction of the lateral acceleration can be computed as:

$$\hat{a}_y = \left(w_{1_{a_y}}\hat{a}_{y_1} + w_{2_{a_y}}\hat{a}_{y_2}\right)$$
$$\begin{cases} w_{1_{a_y}} = 1 - w_{2_{a_y}} \\ w_{2_{a_y}} = \frac{1}{2}e^{-\frac{(100\,max(|\lambda_{fj}|,|\lambda_{rj}|))^2}{2\sigma^2}} \end{cases}$$

where $\sigma$ is a constant parameter and $\lambda_{ij}$ is an approximated slip ratio:

$$\begin{cases} \lambda_{fj} = \frac{R_e\omega_{fj}\cos(\delta) - \hat{v}_x}{\max(R_e\omega_{fj}\cos(\delta), \hat{v}_x)} & \text{front wheels} \\ \lambda_{rj} = \frac{R_e\omega_{rj} - \hat{v}_x}{\max(R_e\omega_{rj}, \hat{v}_x)} & \text{rear wheels} \end{cases}$$

As can be seen, the method used for the lateral acceleration sensor fault detection and reconstruction is similar to the method used for the longitudinal acceleration fault detection and reconstruction. Again, the weighting may be such that the model used to determine the virtual sensor value that is more suited to a determined vehicle or road condition (here, wheel slip) is weighted progressively as that road conditions becomes more prevalent.

In still another example, the virtual values $r_1$, $r_2$ for yaw rate can be computed as:

$$\hat{r}_1 = \begin{cases} \frac{a_y - g\sin(\hat{\phi}_v + \hat{\Phi}_r)}{\hat{v}_x} & \hat{v}_{x_2} \geq v_0 \\ \left(\frac{\omega_{rr} - \omega_{rl}}{e}R_e\right) & \hat{v}_{x_2} < v_0 \end{cases}$$

$$\hat{r}_2 = \left[\left(\frac{\omega_{fr} - \omega_{fl}}{e}R_e\right)\cos(\delta)\right]$$

Where $v_0$ represents a sufficiently low speed that is a calibratable parameter.

One of the virtual yaw rate values is determined based on lateral acceleration and longitudinal velocity or rear wheel acceleration depending upon the longitudinal velocity and the other of the virtual yaw rate values is determined based on steering angle and front wheel angular velocity. Thus, different models are used to determine the virtual sensor values respectively based on different sensor inputs.

The residual differences associated with the yaw rate can be computed as:

$$R_{1_r} = |r - \hat{r}_1|$$

$$R_{2_r} = |r - \hat{r}_2|$$

The instantaneous adaptive fault threshold associated with the yaw rate can be computed as:

$$T_{i_r} = B_{s_r} + B_{d_r}\left|\frac{1}{2}\left(\left(\frac{\omega_{rr} - \omega_{rl}}{e}R_e\right) + \left(\frac{\omega_{fr} - \omega_{fl}}{e}R_e\right)\cos(\delta)\right)\right|$$

The dynamic adaptive fault threshold associated with the yaw rate can be computed as:

$$T_{d_r} = \max\left(T_{i_r}(k), \frac{1}{W_{F_r}}\left(T_{i_r}(k-1)\ldots, T_{i_r}(k - W_{F_{a_y}})\right)\right)$$

The adaptive time window associated with the yaw rate can be defined as:

$$N_{F_r} = K_{1_r} + K_{2_r}\{\text{round}[\max(T_{d_r}(k), \ldots, T_{d_r}(k-W_{F_r})) - \min(T_{d_r}(k), \ldots, T_{d_r}(k-W_{F_r}))]\}$$

The persistence criterion associated with the yaw rate can be defined as:

$$\text{For } i = k \text{ to } k - N_{F_r}$$
$$\begin{cases} R_{1_r}(i) > T_{d_r}(i) \\ R_{2_r}(i) > T_{d_r}(i) \end{cases}$$

The yaw rate may be reconstructed as:

$$\hat{r} = (w_{1_r}\hat{r}_1 + w_{2_r}\hat{r}_2)$$

As can be seen, the method used for the yaw rate sensor fault detection and reconstruction is similar to the method used for the longitudinal acceleration fault detection and reconstruction.

Following the described method, explicit fault signatures can be assigned to each possible sensor failure as listed in Table 1. As an example, Table 1 shows that the failure of the lateral acceleration sensor generates a unique fault signature $[S_{a_y} S_r S_{a_x}] = [0\ 1\ 0]$. Consequently, the failure of each sensor can be detected and localized. In the case that a fault is detected by the algorithm, the failed signal can be reconstructed using the virtual sensors as indicated in Table 1.

TABLE 1

Decision logic for detection and reconstruction of sensor faults

| Faulty Sensor | Effect visible in the residual | | | | | | Fault Signature | | | Reconstructed Signal |
|---|---|---|---|---|---|---|---|---|---|---|
| | $R_{a_{y_1}}$ | $R_{a_{y_2}}$ | $R_{r_1}$ | $R_{r_2}$ | $R_{a_{x_1}}$ | $R_{a_{x_2}}$ | $S_{a_y}$ | $S_r$ | $S_{a_x}$ | |
| $a_y$ | Yes | Yes | Yes | No | Yes | No | 1 | 0 | 0 | $\hat{a}_y$ |
| r | Yes | No | Yes | Yes | Yes | No | 0 | 1 | 0 | $\hat{r}$ |
| $a_x$ | Yes | No | Yes | No | Yes | Yes | 1 | 0 | 1 | $\hat{a}_x$ |
| No Fault | No | No | No | No | No | No | 0 | 0 | 0 | NA |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer-implemented method, comprising:
   receiving, by a processor, sensor data indicating a measured value from a first sensor;
   receiving, by the processor, sensor data indicating measured values from a plurality of other sensors;
   computing, by the processor, a first virtual value of the first sensor based on a first vehicle model and the sensor data from a first subset of the plurality of other sensors;
   computing, by the processor, a second virtual value of the first sensor based on a second vehicle model and the sensor data from a second subset of the plurality of other sensors;
   computing, by the processor, a first residual difference between the measured value from the first sensor and the first virtual value;
   computing, by the processor, a second residual difference between the measured value from the first sensor and the second virtual value;
   detecting, by the processor, that a fault exists in the first sensor based on the first residual difference, the second residual difference and a dynamic adaptive fault threshold;
   when the fault in the first sensor is detected, reconstructing, by the processor, a sensor signal based on the first virtual value, the second virtual value, and computed weights applied to the first virtual value and the second virtual value; and
   generating, by the processor, a control value based on the sensor signal, instead of the measured value of the first sensor, and for use in control of a vehicle,
   wherein the dynamic adaptive fault threshold is a larger one of a current instantaneous adaptive fault threshold and an averaged instantaneous adaptive fault threshold, wherein the averaged instantaneous adaptive fault threshold occurs over a dynamic threshold window size, and wherein the window size is representative of a window time and is set by a predetermined number of previous instantaneous adaptive fault thresholds.

2. The method of claim 1, wherein the detecting that the fault exists comprises comparing the first and second residual differences with the dynamic adaptive fault threshold.

3. The method of claim 2, wherein the comparing the first and second residual differences with the dynamic adaptive fault threshold comprises detecting that the first and second residual differences exceed the dynamic adaptive fault threshold for a predetermined time period.

4. The method of claim 3, wherein the dynamic adaptive fault threshold is computed using at least one of a driving condition and a dynamic region.

5. The method of claim 1, wherein the reconstructing the sensor signal is based on a weighted average of the first virtual value and the second virtual value.

6. The method of claim 1, wherein the first sensor is a lateral acceleration sensor, and wherein the plurality of other sensors includes a steering angle sensor, an angular velocity sensor, and a yaw rate sensor.

7. The method of claim 1, wherein the first sensor is a yaw rate sensor, and wherein the plurality of other sensors includes a steering angle sensor, an angular velocity sensor, a lateral acceleration sensor, and a longitudinal velocity sensor.

8. The method of claim 1, wherein the first sensor is a longitudinal acceleration sensor, and wherein the plurality of other sensors includes a steering angle sensor, an angular velocity sensor, and a longitudinal velocity sensor.

9. A system, comprising:
   a first non-transitory module that receives, by a processor, sensor data indicating a measured value from a first sensor, that receives, by the processor, sensor data indicating measured values from a plurality of other sensors, that computes, by the processor, a first virtual value of the first sensor based on a first vehicle model and a first subset of the sensor data from the plurality of other sensors, and that computes, by the processor, a second virtual value of the first sensor based on a second vehicle model and the sensor data from a second subset of the plurality of other sensors;
   a second non-transitory module that computes, by the processor, a first residual difference between the measured value from the first sensor and the first virtual value, that computes, by the processor, a second residual difference between the measured value from the first sensor and the second virtual value; and
   a third non-transitory module that detects, by the processor, that a fault exists in the first sensor based on the first residual difference, the second residual difference and a dynamic adaptive fault threshold, and when the fault in the first sensor is detected, reconstructs, by the processor, a sensor signal based on the first virtual value, the second virtual value, and computed weights applied to the first virtual value and the second virtual value, and generates, by the processor, a control value based on the sensor signal instead of the measured value of the first sensor, and for use in control of a vehicle, wherein the dynamic adaptive fault threshold is a larger one of a current instantaneous adaptive fault threshold and an averaged instantaneous adaptive fault threshold, wherein the averaged instantaneous adaptive fault threshold occurs over a dynamic threshold window size, and wherein the window size is representative of a window time and is set by a predetermined number of previous instantaneous adaptive fault thresholds.

10. The system of claim 9, wherein the third non-transitory module detects that the fault exists by comparing the first and second residual differences with the dynamic adaptive fault threshold.

11. The system of claim 10, wherein the third non-transitory module compares the first and second residual differences with the dynamic adaptive fault threshold by detecting that the first and second residual differences exceed the dynamic adaptive fault threshold for a predetermined time period.

12. The system of claim 9, wherein the dynamic adaptive fault threshold is computed using at least one of a driving condition and a dynamic region.

13. The system of claim 9, wherein the third non-transitory module reconstructs the sensor signal based on a weighted average of the first virtual value and the second virtual value.

14. The system of claim 9, wherein the first sensor is a lateral acceleration sensor, and wherein the plurality of other sensors includes a steering angle sensor, an angular velocity sensor, and a yaw rate sensor.

15. The system of claim 9, wherein the first sensor is a yaw rate sensor, and wherein the plurality of other sensors includes a steering angle sensor, an angular velocity sensor, a lateral acceleration sensor, and a longitudinal velocity sensor.

16. The system of claim 9, wherein the first sensor is a longitudinal acceleration sensor, and wherein the plurality of other sensors includes a steering angle sensor, an angular velocity sensor, and a longitudinal velocity sensor.

* * * * *